(12) United States Patent
Standaert et al.

(10) Patent No.: US 9,206,267 B2
(45) Date of Patent: Dec. 8, 2015

(54) CATALYST COMPOSITION FOR THE (CO)POLYMERIZATION OF PROPYLENE

(71) Applicant: Total Research & Technology Feluy, Seneffe (BE)

(72) Inventors: Alain Standaert, Brussels (BE); Jerome Gromada, Waterloo (BE); David Vandewiele, Strepy-bracquegnies (BE)

(73) Assignee: Total Research & Technology Feluy, Seneffe (Feluy) (BE)

( * ) Notice: Subject to any disclaimer, the term of this patent is extended or adjusted under 35 U.S.C. 154(b) by 0 days.

(21) Appl. No.: 14/215,235

(22) Filed: Mar. 17, 2014

(65) Prior Publication Data

US 2014/0200316 A1     Jul. 17, 2014

Related U.S. Application Data

(63) Continuation of application No. 12/305,217, filed as application No. PCT/EP2007/056173 on Jun. 21, 2007.

(30) Foreign Application Priority Data

Jun. 21, 2006  (EP) .................................. 06115777

(51) Int. Cl.
| | | |
|---|---|---|
| *B01J 31/00* | (2006.01) | |
| *C08F 4/02* | (2006.01) | |
| *C08F 4/60* | (2006.01) | |
| *C08F 4/44* | (2006.01) | |
| *C08F 2/00* | (2006.01) | |
| *C08F 110/06* | (2006.01) | |
| *C08F 10/06* | (2006.01) | |
| *C08F 210/06* | (2006.01) | |

(52) U.S. Cl.
CPC ............... *C08F 10/06* (2013.01); *C08F 110/06* (2013.01); *C08F 210/06* (2013.01); *C08F 2410/04* (2013.01)

(58) Field of Classification Search
CPC ............ B01J 31/00; B01J 37/00; C08F 4/02; C08F 4/60; C08F 4/06; C08F 4/42; C08F 4/44; C08F 110/02
USPC .................. 526/209, 213, 351; 502/126, 127
See application file for complete search history.

(56) References Cited

U.S. PATENT DOCUMENTS

2005/0187360 A1 *  8/2005  Blackmon et al. ......... 526/124.3

FOREIGN PATENT DOCUMENTS

| EP | 0361494 | * | 4/1990 | ............. C08F 10/00 |
|---|---|---|---|---|
| JP | 3-7703 A | | 1/1991 | |
| JP | 2005-187651 A | | 7/2005 | |
| WO | WO 0063261 A1 | * | 10/2000 | |
| WO | 2006/037705 A1 | | 4/2006 | |

OTHER PUBLICATIONS

Edward P. Moore, Jr., Polypropylene Handbook, May 15, 1998, pp. 19-20.

Office Action issued in Japanese Application No. 2009-515880 mailed on Jun. 25, 2013, and an English translation thereof (3 pages).

* cited by examiner

*Primary Examiner* — Elizabeth Eng

(57) ABSTRACT

The present invention relates to a process for the production of propylene polymers in the presence of a blend of a first Ziegler-Natta catalyst, which comprises a titanium compound having at least one titanium-halogen bond and a diether compound as internal electron donor, and a second Ziegler-Natta catalyst, which comprises a titanium compound having at least one titanium-halogen bond and a succinate compound as internal electron donor.

37 Claims, No Drawings

CATALYST COMPOSITION FOR THE (CO)POLYMERIZATION OF PROPYLENE

CROSS-REFERENCE TO RELATED APPLICATIONS

This application is a continuation of 12/305,217 filed Dec. 17, 2008, which claims the benefit of PCT/EP2007/056173, filed Jun. 21, 2007, which claims priority from EP 06115577.2, filed Jun. 21, 2006.

FIELD OF THE INVENTION

The present invention relates to the polymerization of propylene with one or more optional comonomers in presence of a blend of at least two Ziegler-Natta catalysts with different internal donors.

THE PRIOR ART AND THE TECHNICAL PROBLEM

Polypropylene has become one of the most widely used polymers due to its good combination of properties. Most of the polypropylene today is produced by polymerizing propylene and optionally one or more comonomers in presence of Ziegler-Natta catalysts, i.e. transition metal coordination catalysts, specifically titanium halide containing catalysts. Such catalysts also contain internal electron donors, with phthalates being the most widely used. Polypropylenes made with such catalysts have an acceptable balance of properties. To further improve, different catalyst compositions, and especially different internal electron donors have been developed and tested, and in some cases also commercialized.

WO 02/100904 discloses 1,3-diethers as internal electron donors, said diethers having the general formula $R^1R^2C(CH_2OR)_2$ with R being a $C_1$-$C_{10}$ alkyl group, $R^1$ being a linear or branched primary alkyl radical with at least three carbon atoms, and $R^2$ being a secondary alkyl or cycloalkyl radical, which is different from isopropyl. Both, $R^1$ and $R^2$ may optionally contain a heteroatom. The use of 1,3-diethers leads to polypropylenes with narrow molecular weight distribution and very high isotacticity.

WO 00/63261 discloses substituted succinates as internal electron donors. Polypropylenes made with a polymerization catalyst comprising a succinate as internal electron donor are characterized by a broad molecular weight distribution and high isotacticity.

While propylene polymers produced with diether or succinate compounds as internal electron donors have shown an improvement in properties over phthalates there are still some drawbacks. Propylene polymers produced in presence of a Ziegler-Natta catalyst with a diether compound as internal electron donor have acceptable mechanical properties but due to their narrow molecular weight distribution sometimes have limited processability. On the other hand, propylene polymers produced in presence of a Ziegler-Natta catalyst with a succinate compound as internal electron donor sometimes have processability problems due to their broad molecular weight distribution. They also require more effort in production.

Thus, there is an interest in further improving the properties of propylene polymers, particularly in improving the properties and/or processability.

BRIEF DESCRIPTION OF THE INVENTION

We have now discovered a process that allows producing propylene polymers with an improved combination of properties and processability.

Thus, the present invention relates to a process for the production of propylene polymers, said process comprising the step of polymerizing propylene and one or more optional comonomers in one or more polymerization reactors in presence of
(a) a Ziegler-Natta catalyst comprising a titanium compound having at least one titanium-halogen bond, and a diether compound as internal electron donor, both supported on a magnesium halide in active form,
(b) a Ziegler-Natta catalyst comprising a titanium compound having at least one titanium-halogen bond, and a succinate compound as internal electron donor, both supported on a magnesium halide in active form,
(c) an organoaluminium compound, preferably an Al-trialkyl, more preferably Al-triethyl, and
(d) an optional external donor,
characterized in that the weight ratio of diether catalyst to succinate catalyst is in the range from 0.01 to 100, preferably from 0.02 to 10, even more preferably from 0.05 to 5, and most preferably from 0.1 to 1.5.

In addition the present invention relates to a propylene polymer produced with such a process.

DETAILED DESCRIPTION OF THE INVENTION

For easier understanding the terms "diether catalyst" and "succinate catalyst" are used to denote a Ziegler-Natta catalyst with a diether compound as internal electron donor resp. a Ziegler-Natta catalyst with a succinate compound as internal electron donor.

The propylene polymers of the present invention can be homopolymers or copolymers of propylene and one or more comonomers, which can be ethylene or a $C_4$-$C_{20}$ alpha-olefin. The copolymers can be random copolymers or heterophasic copolymers.

The random copolymers of the present invention comprise at least 0.1 wt % of comonomer(s), preferably at least 0.2 wt %, more preferably at least 0.5 wt %, even more preferably at least 1 wt %, and most preferably at least 2 wt %. They comprise up to 10 wt % of comonomer(s), preferably up to 8 wt %, and most preferably up to 6 wt %. Preferably, the random copolymers are copolymers of propylene and ethylene.

The heterophasic copolymers of the present invention comprise a matrix, which in turn is made of propylene homopolymer or random copolymer as defined above, and a rubber phase. Preferably, the heterophasic copolymers are copolymers of propylene and ethylene. They have an ethylene content in the range from 4 wt % to 15 wt %. The heterophasic copolymers comprise from 5 wt % to 35 wt % of rubber phase. Preferably, the rubber phase is an ethylene propylene rubber.

The polymerization of propylene and one or more optional comonomers is performed in presence of one or more Ziegler-Natta catalysts, an organoaluminium compound and an optional external donor.

A Ziegler-Natta catalyst comprises a titanium compound having at least one titanium-halogen bond, and an internal electron donor, both supported on magnesium halide in active form. For the present invention it is essential that the blend of Ziegler-Natta catalysts comprises at least a diether catalyst and a succinate catalyst. Preferably, the blend of Ziegler-Natta catalysts is a blend of a diether catalyst and a succinate catalyst. Such catalysts are known in the art and can for example be obtained by reaction of an anhydrous magnesium halide with an alcohol, followed by titanation with a titanium halide and reaction with a diether compound resp. a succinate compound as internal electron donor according to the methods described in patent applications WO 00/63261 and WO 02/100904. Such a catalyst comprises 2.5-7.5 wt % of titanium, about 10-20 wt % of magnesium and about 5-30 wt % of internal donor with chlorine and solvent making up the remainder.

Particularly suited diether compounds are 1,3-diethers of formula $$R^1R^2C(CH_2OR^3)(CH_2OR^4) \qquad (I)$$

wherein $R^1$ and $R^2$ are the same or different and are $C_1$-$C_{18}$ alkyl, $C_3$-$C_{18}$ cycloalkyl or $C_7$-$C_{18}$ aryl radicals; $R^3$ and $R^4$ are the same or different and are $C_1$-$C_4$ alkyl radicals; or are 1,3-diethers in which the carbon atom in position 2 belongs to a cyclic or polycyclic structure made up of 5, 6 or 7 carbon atoms and containing two or three unsaturations. Ethers of this type are disclosed in published European patent applications EP361493 and EP728769. Representative examples of said diethers are 2-methyl-2-isopropyl-1,3-dimethoxypropane; 2,2-diisobutyl-1,3-dimethoxypropane; 2-isopropyl-2-cyclo-pentyl-1,3-dimethoxypropane; 2-isopropyl-2-isoamyl-1,3-dimethoxypropane; 9,9-bis(methoxymethyl) fluorene.

Suitable succinate compounds have the formula

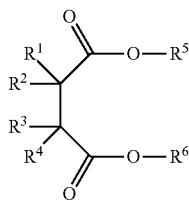

(II)

wherein $R^1$ to $R^4$ are equal to or different from one another and are hydrogen, or a C1-C20 linear or branched alkyl, alkenyl, cycloalkyl, aryl, arylalkyl or alkylaryl group, optionally containing heteroatoms, and $R^1$ to $R^4$, being joined to the same carbon atom, can be linked together to form a cycle; and $R^5$ and $R^6$ are equal to or different from one another and are a linear or branched alkyl, alkenyl, cycloalkyl, aryl, arylalkyl or alkylaryl group, optionally containing heteroatoms.

The organoaluminium compound is advantageously an Al-alkyl compound of the Al-trialkyls family, such as Al-triethyl, Al-triisobutyl, Al-tri-n-butyl, and linear or cyclic Al-alkyl compounds containing two or more Al atoms bonded to each other by way of O or N atoms, or $SO_4$ or $SO_3$ groups. Al-triethyl is preferred. Advantageously, the Al-trialkyl has a hydride content, expressed as $AlH_3$, of less than 1.0 wt % with respect to the Al-trialkyl. More preferably, the hydride content is less than 0.5 wt %, and most preferably the hydride content is less than 0.1 wt %.

The organoaluminium compound is used in such an amount as to have a molar ratio Al/Ti in the range from 1 to 1000. Preferably, the upper limit is 500. More preferably, the upper limit is 400. The lower limit is preferably 10, more preferably 20, and most preferably 50.

Suitable external donors include certain silanes, ethers, esters, amines, ketones and heterocyclic compounds. It is preferred to use a 1,3-diether as described above or a silane. It is most preferred to use silanes of the general formula $$R^a_p R^b_q Si(OR^c)_{(4-p-q)}$$

wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different. Specific examples of such silanes are (tert-butyl)$_2$Si(OCH$_3$)$_2$, (cyclohexyl)(methyl) Si(OCH$_3$)$_2$ (referred to as "C donor"), (phenyl)$_2$Si(OCH$_3$)$_2$ and (cyclopentyl)$_2$ Si(OCH$_3$)$_2$ (referred to as "D donor").

In the production of propylene homopolymers the molar ratio of organoaluminium compound to external donor ("AI/ED"), if present, ranges advantageously between 1 and 1000. The upper limit of the Al/ED ratio preferably is at most 800, more preferably at most 600 and most preferably at most 400. The lower limit of the Al/ED ratio preferably is at least 5, more preferably at least 10, even more preferably at least 20 and most preferably at least 30.

In the production of propylene copolymers the molar ratio of organoaluminium compound to external donor ("AI/ED"), if present, ranges from 1 to 200. The upper limit of the Al/ED ratio preferably is at most 150, more preferably at most 100, even more preferably at most 80 and most preferably at most 65. The lower limit of the Al/ED ratio preferably is at least 3 and more preferably at least 5.

It has now been surprisingly found that (co)polymerizing propylene in presence of at least a diether catalyst and a succinate catalyst does not lead to inhomogenities in the final propylene polymer but yields a very homogeneous propylene polymer with improved properties and/or processability.

For the present invention the weight ratio of diether catalyst to succinate catalyst ranges from 0.01 to 100. The upper limit of the weight ratio is preferably at most 10, more preferably at most 5, even more preferably at most 3, and most preferably at most 1.5. The lower limit of the weight ratio is preferably at least 0.02, more preferably at least 0.05, even more preferably at least 0.1 and most preferably at least 0.2.

Such a blend of catalysts can be supplied to a polymerization plant either in pre-prepared form or can be prepared directly at the polymerization plant. Alternatively, it is also possible to introduce the catalysts separately into the polymerization reactor, possibly also at different places. If the production of the propylene polymer is conducted in more than one polymerization reactor it is also possible to introduce the catalysts into different polymerization reactors.

The polymerization of propylene and one or more optional comonomers can be carried out according to known techniques. The polymerization can for example be carried out in liquid propylene as reaction medium. It can also be carried out in a diluent, such as an inert hydrocarbon (slurry polymerization) or in the gas phase. For the production of heterophasic propylene copolymers the polymerization is preferably carried out in one or more polymerization reactors in series, employing liquid propylene as reaction medium and then in one or more gas phase reactors in series, as is done for example in a propylene polymer production line based on Spheripol technology. It is preferred to produce a heterophasic propylene copolymer sequentially in (a) one or more loop reactors and (b) one or more gas phase reactors. It is most preferred to employ only one gas phase reactor.

For the present invention propylene homopolymers and random copolymers are preferably produced by polymerization in liquid propylene at temperatures in the range from 20° C. to 100° C. Preferably, temperatures are in the range from 60° C. to 80° C. The pressure can be atmospheric or higher. It is preferably between 25 and 50 bar. The molecular weight of the polymer chains, and in consequence of the melt flow of the propylene polymer, is regulated by adding hydrogen.

Propylene polymers produced according to the present invention are characterized by a broad molecular weight distribution and a high isotacticity index. In fact, the present invention allows the production of bimodal propylene polymers in one single polymerization reactor. In particular propylene polymers with high melt flow index, i.e. low viscosity, show increased melt strength due to tailing in the high molecular weight fraction, thus allowing for better processability e.g. in extrusion applications. For the purposes of the present invention a bimodal propylene polymer, i.e. a propylene polymer having a bimodal molecular weight distribution, comprises two propylene polymer fractions whose molecular weights are different enough to be reproducibly separated by a suitable analytical method, for example by gel permeation chromatography (GPC).

Heterophasic propylene copolymers produced according to the present invention have a homo- or random copolymer matrix of broad or bimodal molecular weight distribution and, if applicable, a bimodal distribution of comonomer insertion and a rubber phase with a broad or bimodal molecular weight distribution and a bimodal distribution of comonomer insertion. The rubber phase can for example be an ethylene propylene rubber (EPR). With a constant volume ratio R in the feed streams to the polymerization reactor, i.e. R=C2 (vol %)/(C2(vol %)+C3(vol %)), of 0.42 the EPR resulting from diether as internal donor has 42.7 wt % of ethylene, the EPR resulting from succinate as internal donor has 47.1 wt % of ethylene. Without wishing to be bound by theory, this is attributed to the higher reactivity of a succinate catalyst towards ethylene as compared to a diether catalyst. In consequence, a succinate catalyst allows for the incorporation of a higher level of ethylene at a given ethylene concentration in the polymerization reactor. The resulting propylene polymer can be said to have bimodal ethylene distribution in the polymer chains. This behavior offers the additional advantage of allowing the production of a wider range of products on an existing polymerization plant. In particular, the present invention avoids having to use two gas-phase reactors, as is currently the case if a succinate compound is used as sole internal electron donor, for the production of an EPR phase so as to give a heterophasic copolymer with good stiffness/impact balance.

The propylene polymers made according to the present invention show improved flow, shrinkage and processing behavior.

The propylene polymer may contain additives such as, by way of example, antioxidants, light stabilizers, acid scavengers, lubricants, antistatic additives, nucleating/clarifying agents, colorants. An overview of such additives may be found in Plastics Additives Handbook, ed. H. Zweifel, 5$^{th}$ edition, 2001, Hanser Publishers.

The propylene polymers of the present invention can be used in extrusion applications and injection molding applications, particularly in film extrusion, fiber extrusion, sheet, injection molding, blow molding, extrusion stretch blow molding, thermoforming, etc.

EXAMPLES

Melt flow (MFI) is measured according to norm ASTM D 1238, condition L.

Xylene solubles (XS) are determined as follows: Between 4.5 and 5.5 g of propylene polymer are weighed into a flask and 300 ml xylene are added. The xylene is heated under stirring to reflux for 45 minutes. Stirring is continued for 15 minutes exactly without heating. The flask is then placed in a thermostat bath set to 25° C.+/−1° C. for 1 hour. The solution is filtered through Whatman n° 4 filter paper and exactly 100 ml of solvent are collected. The solvent is then evaporated and the residue dried and weighed. The percentage of xylene solubles ("XS") is then calculated according to XS (in wt %)=(Weight of the residue/Initial total weight of $PP$)*300

Molecular weights and molecular weight distribution (MWD) have been measured by GPC with trichlorobenzene as solvent. Calibration is done via commercially available polystyrene standards.

Polymerization and Polymer Properties

The polymerizations were conducted in an autoclave bench reactor having a volume of 3 l. The reactor was first charged with liquid propylene and an appropriate amount of hydrogen for melt flow control. Then a mix of polymerization catalyst(s), aluminium triethyl, and (cyclopentyl)$_2$Si(OCH$_3$)$_2$ (generally referred to as "D-donor") as external donor was flushed into the reactor with liquid propylene. Total volume of liquid propylene in the reactor was 2 l. The reactor was then heated to 70° C. The polymerization was run for 60 minutes and then stopped by flashing of the propylene. The retrieved propylene polymer fluff was worked up by standard procedures.

As polymerization catalysts Avant ZN 126 and Avant ZN 168 were employed. Avant ZN 126 is a Ziegler-Natta catalyst with 3.5 wt % titanium and a diether compound as internal electron donor, which is commercially available from Basell. Avant ZN 168 is a Ziegler-Natta catalyst with 2.6 wt % titanium and a succinate compound as internal electron donor, which is commercially available from Basell.

Further polymerization conditions are given in table I. Properties of the obtained propylene polymers are shown in table II.

TABLE I

|  | ZN 126 | ZN 168 | Al/Si | Al/Ti | Prod. |
|---|---|---|---|---|---|
|  | mg | mg | molar ratio | molar ratio | g PP/g catalyst |
| Ex. 1 | 3.9 | 12.1 | 20 | 285 | 23500 |
| Ex. 2 | 5.3 | 5.7 | 20 | 281 | 29700 |
| Ex. 3 | 9.8 | 10.3 | 10 | 281 | 24900 |
| Ex. 4 | 4.7 | 4.8 | 20 | 281 | 30400 |
| Ex. 5 | 4.1 | 12.4 | 20 | 285 | 28400 |
| Ex. 6 | 5 | 5.1 | 100 | 281 | 42500 |
| Ex. 7 (comp) | 10.2 | — | 50 | 300 | 53100 |
| Ex. 8 (comp) | — | 20.1 | 20 | 200 | 26600 |

TABLE II

|  | MFI | Xs | Mn | Mw | Mz | MWD |
|---|---|---|---|---|---|---|
|  | dg/min | wt % | kDa | kDa | kDa |  |
| Ex. 1 | 1.2 | 1.9 |  |  |  |  |
| Ex. 2 | 1.9 | 1.9 |  |  |  |  |
| Ex. 3 | 5.7 | 2.2 |  |  |  |  |
| Ex. 4 | 24.7 | 2.5 | 27 | 245 | 1506 | 9.0 |
| Ex. 5 | 7.8 | 2.3 | 33 | 348 | 2516 | 10.6 |
| Ex. 6 | 18 | 3.2 |  |  |  |  |
| Ex. 7 (comp) | 9.8 | 2.7 | 39 | 270 | 1052 | 6.9 |
| Ex. 8 (comp) | 3.3 | 3 |  |  |  |  |

The invention claimed is:

1. A process comprising:
polymerizing propylene in the presence of an organoaluminium compound and one or more Ziegler-Natta catalysts comprising:
a titanium compound having at least one titanium-halogen bond;
a diether compound as an internal electron donor; and
a succinate compound as an internal electron donor, wherein the titanium compound and the internal electron donors are supported on magnesium halide in active form, and wherein the succinate compound is represented by the formula (II):

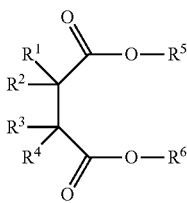

(II)

wherein $R^1$ to $R^4$ are each hydrogen; and
wherein $R^5$ and $R^6$ are equal to or different from one another and are a linear or branched alkyl, alkenyl, cycloalkyl, aryl, arylalkyl or alkylaryl group, optionally containing heteroatoms.

2. The process of claim 1, wherein the polymerizing of the propylene is carried out in the presence of one Ziegler-Natta catalyst.

3. The process of claim 1, characterized in that a weight ratio of diether to succinate ranges from 0.01 to 100.

4. The process of claim 3, characterized in that the weight ratio of diether to succinate is at most 10.

5. The process of claim 4, characterized in that the weight ratio of diether to succinate is at most 5.

6. The process of claim 5, characterized in that the weight ratio of diether to succinate is at most 1.5.

7. The process of claim 1, wherein the diether compound is a 1,3-diether represented by formula I:

$R^1R^2C(CH_2OR^3)(CH_2OR^4)$ (I)

wherein $R^1$ and $R^2$ are the same or different and are each a $C_1$-$C_{18}$ alkyl, $C_3$-$C_{18}$ cycloalkyl, or $C_7$-$C_{18}$ aryl radical; wherein $R^3$ and $R^4$ are the same or different and are each a $C_1$-$C_4$ alkyl radical.

8. The process of claim 1, wherein the diether compound is a 1,3-diether in which the carbon atom in position 2 is part of a cyclic or polycyclic structure formed of from five to seven carbon atoms and containing two or three unsaturations.

9. The process of claim 1, wherein the diether compound is 2-methyl-2-isopropyl-1,3-dimethoxypropane; 2,2-diisobutyl-1,3-dimethoxypropane; 2-isopropyl-2-cyclo-pentyl-1,3-dimethoxypropane; 2-isopropyl-2-isoamyl-1,3-dimethoxypropane; or 9,9-bis(methoxymethyl)fluorene.

10. The process of claim 1, wherein the polymerizing of the propylene is carried out in the presence of more than one Ziegler-Natta catalyst.

11. The process of claim 1, wherein the organoaluminum compound is an aluminum trialkyl.

12. The process of claim 11, wherein the organoaluminum compound is aluminum triethyl, aluminum triisobutyl, or aluminum tri-n-butyl.

13. The process of claim 12, wherein the organoaluminum compound is an aluminum triethyl.

14. The process of claim 11, wherein the organoaluminum compound is a linear or cyclic aluminum alkyl compound containing two or more aluminum atoms bounded to each other by way of an oxygen atom, a nitrogen atom, an $SO_4$ group, or an $SO_3$ group.

15. The process of claim 11, wherein the aluminum trialkyl has a hydride content $AlH_3$ of less than 1.0 wt. %.

16. The process of claim 1, wherein the organoaluminum compound is present in an amount such that a molar ratio of aluminum to titanium in the one or more Ziegler-Natta catalysts ranges from 1 to 1000.

17. The process of claim 1, wherein the polymerizing of the propylene is carried out in the presence of an external donor.

18. The process of claim 17, wherein the external donor is a silane, ether, ester, amine, ketone, or heterocyclic compound.

19. The process of claim 17, wherein the external donor is a 1,3-diether.

20. The process of claim 17, wherein the external donor is a silane.

21. The process of claim 20, wherein the silane is represented by the formula:

$R^a_p R^b_q Si(OR^c)_{(4-p-q)}$ wherein $R^a$, $R^b$, and $R^c$ are the same or different and are each a hydrocarbon radical, wherein p and q are numbers ranging from 0 to 3 with their sum p+q being equal to or less than 3.

22. The process of claim 21, wherein $R^a$, $R^b$, and $R^c$ are each an alkyl group or a cycloalkyl group.

23. The process of claim 20, wherein the silane is (tert-butyl)$_2$Si(OCH$_3$)$_2$, (cyclohexyl)(methyl) Si(OCH$_3$)$_2$, (phenyl)$_2$Si(OCH$_3$)$_2$ or (cyclopentyl)$_2$ Si(OCH$_3$)$_2$.

24. The process of claim 17, wherein a ratio of the organoaluminum compound to the external donor is between 1 and 1000.

25. The process of claim 1, further comprising retrieving a polypropylene.

26. The process of claim 25, wherein the polypropylene is a homopolymer.

27. The process of claim 26, wherein the polymerization is carried out in liquid propylene at a temperature ranging from 20° C. to 100° C. and a pressure between 25 and 50 bar.

28. The process of claim 25, wherein the polypropylene is a random copolymer comprising from 0.1 wt. % to 8 wt. % of a $C_4$-$C_{20}$ alpha-olefin comonomer.

29. The process of claim 25, wherein the polypropylene is a random copolymer comprising from 0.1 wt. % to 8 wt. % of ethylene.

30. The process of claim 28, wherein the polymerization is carried out in liquid propylene at a temperature ranging from 20° C. to 100° C. and a pressure between 25 and 50 bar.

31. The process of claim 25, wherein the polypropylene is a heterophasic copolymer having a matrix phase of a polypropylene homopolymer or random copolymer, and a rubber phase.

32. The process of claim 31, wherein the polymerization is carried out in one or more polymerization reactors connected in series employing liquid propylene as a reaction medium, followed by one or more gas phase reactors connected in series.

33. The process of claim 31, wherein the polymerization is carried out in one or more loop reactors connected in series employing liquid propylene as a reaction medium, followed by only one gas phase reactor.

34. The process of claim 25, wherein the polypropylene is produced in one single polymerization reactor and exhibits a bimodal molecular weight distribution.

35. The process of claim 1, wherein the diether compound is 2-methyl-2-isopropyl-1,3-dimethoxypropane; 2,2-di-isobutyl-1,3-dimethoxypropane; 2-isopropyl-2-cyclo-pentyl-1,3-dimethoxypropane; or 2-isopropyl-2-isoamyl-1,3-dimethoxypropane; and wherein the one or more Ziegler-Natta catalysts are formed by reacting anhydrous magnesium with an alcohol, followed by titanation with the titanium compound and reaction with the diether compound and the succinate compound.

36. The process of claim 35, characterized in that a weight ratio of diether to succinate ranges from 0.01 to 100.

37. The process of claim 35, wherein the polymerizing of the propylene is carried out in the presence of one Ziegler-Natta catalyst.

\* \* \* \* \*